United States Patent [19]

Bank et al.

[11] 4,320,532

[45] Mar. 16, 1982

[54] APPARATUS FOR AUTOMATIC MONITORING OF SUPERHETERODYNE RADIO RECEIVERS

[76] Inventors: Mikhail U. Bank, ulitsa Sofiiskaya, 40, korpus 1, kv. 128, Leningrad; Valery I. Prozorov, ulitsa Sovetskaya, 94, kv. 21, Sarapul; Nikolai A. Rubichev, p.o. Mendeleeva, ulitsa Pionerskaya, 2, kv. 50, Moskovskaya oblast, Mikhail V. Odnolko, ulitsa Podvoiskogo, 14, korpus 1, kv. 848; Evgeny A. Rozenberg, ulitsa Partizana Germana, 10, korpus 3, kv. 66, both of Leningrad; Alexei F. Bessonov, ulitsa Njutona, 133, kv. 225, Kharkov; Iraida K. Berezjuk, ulitsa Savushkina, 12, kv. 41; Sergei D. Guzikov, Serebristy bulvar, 15, kv. 325, both of Leningrad, all of U.S.S.R.

[21] Appl. No.: 166,456

[22] Filed: Jul. 7, 1980

[30] Foreign Application Priority Data

Dec. 7, 1979 [SU] U.S.S.R. .............................. 2780601

[51] Int. Cl.³ ............................................ H04B 17/00
[52] U.S. Cl. ...................................... 455/226; 455/67
[58] Field of Search ....................... 455/226, 67, 9, 10, 455/237; 178/69 M, 69 R, 69 G; 343/17.7

[56] References Cited

U.S. PATENT DOCUMENTS

| 2,891,217 | 6/1959 | Grieg | 455/226 |
| 3,467,866 | 9/1969 | Palatinus | 455/226 |
| 3,755,741 | 8/1973 | Stove | 455/226 |

OTHER PUBLICATIONS

Measuring System for Automated Production Tests of Broadcast Receivers, Voprosy Elektroniki, Series TRPA, vol. 2, 1975, p. 27031.

Primary Examiner—Tommy P. Chin
Attorney, Agent, or Firm—Myron Greenspan

[57] ABSTRACT

An apparatus for automatic monitoring of superheterodyne radio receivers, comprising a unit for shaping the tune-in frequency signal of the receiver, units for shaping the signals of adjacent channels, and units for shaping the signals of additional channels, their outputs being connected through an adder to the input of the receiver to be tested. Each of the units includes a master oscillator, a mixer with the heterodyne output of the receiver connected thereto, and a filter. Each of the units for shaping the signal of an adjacent channel includes, in addition to the master oscillator, mixer and filter, a second mixer and a shift generator. The apparatus further comprises a desired signal shaper connected to the modulation input of the master oscillator of the tune-in frequency signal shaping unit, two sets of interference signal oscillators connected to the modulation inputs of the master oscillators of the units for shaping the signals of adjacent channels and of the units for shaping the signals of additional channels, respectively, a reference oscillator, and phase-locked loops connected between the reference oscillator and the master oscillators of the signal-shaping units. Connected to the output of the receiver to be tested are a linear distortion analysis unit and a nonlinear distortion and interference analysis unit with their outputs connected to an indicating unit.

5 Claims, 2 Drawing Figures

APPARATUS FOR AUTOMATIC MONITORING OF SUPERHETERODYNE RADIO RECEIVERS

FIELD OF THE INVENTION

The present invention relates to radio instrumentation technique, and more particularly to apparatus for automatic monitoring of superheterodyne radio receivers, and can be used in testing radio-receiving equipment designed for various purposes. The invention can be most advantageously utilized for testing mass-produced broadcast receivers.

BACKGROUND OF THE INVENTION

In general, the choice of an appropriate method and means for monitoring mass-produced radio-receiving equipment is a tradeoff between the tendency to reduce the monitoring time and the desire to increase the objectiveness of the results and the control range. One method to overcome this problem is an automated technique of measuring receiver parameters.

Known in the art is a broadcast receiver monitoring system /cf. "Radioelectronics Review", Series TRPA, issue 2, 1975, pp. 27–31/ comprising frequency synthesizes generating an input test signal, a set of electronically controlled instruments, and a mechanical manipulator performing necessary operations with the control members of the receivers to be tested. All the above-mentioned devices are program-controlled using a computer. This technique provides for a fully automatic monitoring system, but it suffers from a number of disadvantages including a relatively long monitoring time, as the receiver parameters are measured successively; also the receiver has to be tuned to the test signal frequency. A further shortcoming resides in a complexity and high cost of the monitoring equipment. In addition, the use of the mechanical manipulator results in an inflexible system and necessitates a test operator to perform the job, because the mechanical manipulator does not make it possible to detect some faults in the receiver such as the tuning knob play, the vernier pointer sticking, etc.

The above disadvantages are overcome in an apparatus for automatic monitoring of superheterodyne radio receivers as disclosed in U.S. Pat. No. 3,755,741 published in 1973. This apparatus comprises a unit for shaping the receiver tune-in frequency signal, and a shaper of the desired signal for modulating the tune-in frequency signal. The tune-in frequency shaping unit is composed of a master oscillator for generating the voltage at a frequency equal to the intermediate frequency of the receiver, a mixer, a filter, and a modulator, all connected in series, the second input of the mixer being connected to the output of the heterodyne of the receiver to be tested, and the modulating input of the modulator connected to the desired signal shaper formed by an audio-frequency sine-wave oscillator. The output of the modulator is connected to the input of the receiver being tested, while the output of the receiver is connected to an indicating unit.

In this prior art device, the test signal applied to the input of the receiver results from modulating its heterodyne frequency of the intermediate frequency followed by the amplitude modulation of the FM signal by the audio frequency voltage, resulting in the test signal frequency being invariably equal to the receiver tune-in frequency, so that the process of tuning the receiver to the test signal frequency is omitted, thus reducing the monitoring time. In addition, the device is relatively simple in design and, consequently, not expensive.

The apparatus according to the aforementioned U.S. Patent, however, enables only two receiver parameters to be controlled, i.e. the sensitivity and the harmonic distortion factor at a single audio frequency, since the test signal represents an r.f. voltage at a single carrier frequency, amplitude modulated by a low-frequency voltage also at a single frequency. Therefore, the receiver monitoring proves to be not valid, since it is impossible to evaluate the quality of the receiver from two parameters.

Another disadvantage of the apparatus described lies in a complicated FM scheme outside the master oscillator if FM signal receivers are to be tested.

SUMMARY OF THE INVENTION

It is an object of the present invention to provide an apparatus for automatic monitoring of superheterodyne radio receivers, ensuring a reliable monitoring process.

Another object of the invention is providing an apparatus for simultaneous monitoring of superheterodyne radio receivers with respect to a number of parameters.

A further object of the present invention is to provide an apparatus enabling the superheterodyne receivers of AM and FM signals to be appropriately checked.

With these and other objects in view, there is provided an apparatus for automatic monitoring of superheterodyne receivers, comprising a unit for shaping the tune-in signal of the receiver consisting of a master oscillator, a mixer having its one input connected to the output of the master oscillator and the other input connected to the output of the heterodyne of the receiver to be tested, and a filter having its input connected to the output of the mixer, a desired signal shaper for modulating the tune-in frequency of the receiver, and an indicating unit, wherein, according to the invention, there is further provided a reference oscillator, signal-shaping units for adjacent channels, signal-shaping units for additional channels, phase-locked loops, the number of them being equal to that of all the signal shaping units, two sets of interference signal oscillators, an RF signal adder circuit, a linear distortion analysis unit, and a nonlinear distortion and interference analysis unit, each of the units for shaping adjacent channel signals including a master oscillator, a first mixer with one of the inputs connected to the output of the master oscillator of this unit, and the other, with the output of the heterodyne of the receiver being tested, a filter with its input connected to the output of the first mixer, a shift generator, a second mixer with one of its inputs connected with the output of the filter of this unit, while the other input is connected to the output of the shift generator, each of the units for shaping the signals of the additional channels comprising a master oscillator, a mixer with one of its inputs connected to the output of the master oscillator of this unit, and the other input to the heterodyne output of the receiver being tested, and a filter with its input connected with the mixer output of the unit, the modulating input of the master oscillator of the tune-in frequency shaping unit of the receiver being connected to the desired signal shaper output, the modulating inputs of the master oscillators of the units for shaping adjacent channel signals being connected to the outputs of the respective interference signal oscillators of the first set of oscillators, the modulating inputs of the master oscillators of the shaping units for the signals of additional channels being connected with the outputs of the respective interference signal oscillators of the second set of oscillators, each of the phase-locked loops being inserted between the reference frequency oscillator and the master oscillator of one of the signal shaping units, the outputs of the filters of the tune-in frequency shaping unit and of the additional channel signal shaping units, and the outputs of the second mixers of units for shaping the signals of the adjacent channels being connected with the respective inputs of the RF signal adder, the output of said adder being connected with the input of the receiver tested, the inputs both of the linear distortion analysis unit and of the nonlinear distortion and interference analysis unit being connected with the output of the receiver tested, while their outputs are connected to the indicator unit.

In the proposed apparatus, the test signal applied to the input of the receivers is made up of the sum of the tune-in frequency signal of the receiver, the signals of the adjacent channels, and the signal of the additional channels, i.e it corresponds to the actual signals reaching the receivers from the atmosphere and affecting the receiving quality.

In this case the phase-locked loops ensure the stability of the carriers of all the test signal components with respect to one another. The linear distortion analysis unit, given an appropriate structure of the desired signal shaper modulating the tune-in frequency signal of the receiver, allows a proper measurement of the amplitude/frequency characteristic distortion. The nonlinear distortion and interference analysis unit extracting the adjacent and additional channel signals at the output of the receiver provides evaluation of receiver parameters such as adjacent channel selectivity including crosstalk, and additional channel selectivity. Furthermore, the nonlinear distortion and interference analysis unit enables the harmonic factors and intermodulation distortion as well as noise and background noise levels to be estimated, to detect the signals originating within the receiver.

Thus the proposed apparatus ensures a more comprehensive monitoring of the receivers avoiding the increased time required for the monitoring, since the measurement of the above parameters of the receiver at a particular tune-in frequency is carried out simultaneously.

According to one embodiment of the invention, the outputs of the interference signal oscillators of the second set of oscillators are connected to the respective inputs of the master oscillators of the units for shaping the signals of the additional channels.

According to another embodiment of the invention, each unit for shaping the signal of the additional channel comprises one more mixer with one of its inputs connected to the output of the filter of said unit, and the other input connected to the output of one of the interference signal oscillators of the second set, and the output of the unit is connected with the respective input of the RF-signal adder.

It is preferred that the desired signal shaper comprise a number of oscillators with the frequency ratios thereof corresponding to those of the consonance chord, of the harmonics and subharmonics of the frequencies, and it is advisable that the apparatus incorporate a desk connected to the indicating unit for insertion thereinto of the sound reproducing performance data of the receiver to be tested.

The above objects and advantages of the present invention will be more apparent from the following detailed description of the preferred embodiments with reference to the accompanying drawings, wherein:

DESCRIPTION OF THE PREFERRED EMBODIENTS OF THE INVENTION

Figure 1:
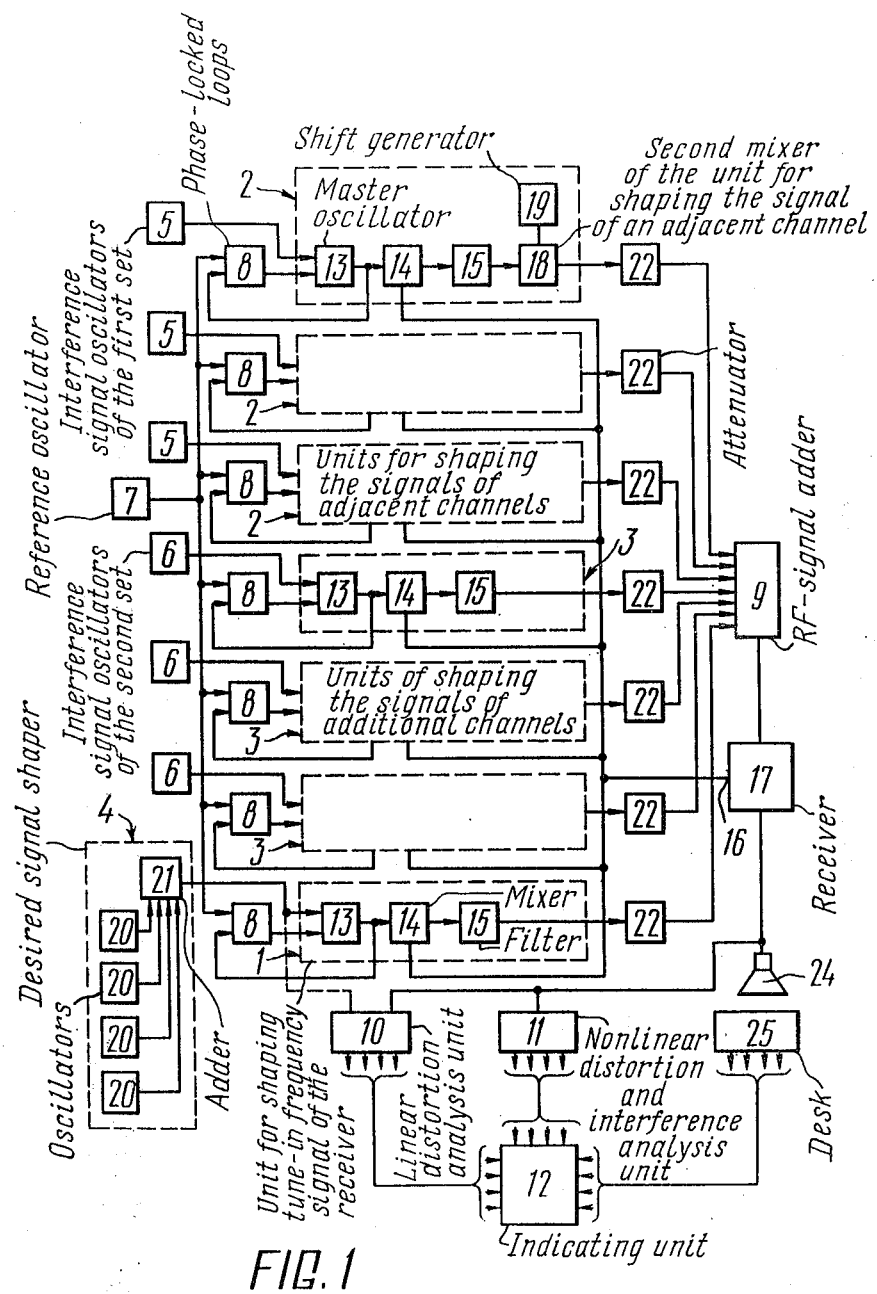
FIG. 1 shows an apparatus for automatic monitoring of superheterodyne receivers according to the invention.

The apparatus for automatic monitoring of superheterodyne receivers according to the invention comprises a unit 1 (FIG. 1) for shaping the tune-in frequency of the receiver, units 2 for shaping the signals of adjacent channels, units 3 for shaping the signals of additional channels, a desired signal shaper 4 for modulating the tune-in frequency of the receiver, interference signal oscillators 5 for modulating the signals of the adjacent channels, interference signal oscillators 6 for modulating or shifting the signal frequencies of the additional channels, a reference oscillator 7, phase-locked loops 8, their numbers equalling the total number of all the units 1, 2, 3, an RF-signal adder 9, a linear distortion analyser 10, a nonlinear distortion and interference analyser 11, and an indicating unit 12.

Although only three units 2 and three units 3 are shown in FIG. 1, there may be any number of these units. The number of the units 2 for shaping the signals of the ajacent channels is determined by the required validity of monitoring and by distributing the atmospheric interference frequencies. For example, the signal shaped by the units 2 may have frequencies spaced by 5, 9, 18 kHz from the tune-in frequency of the receiver, in case the AM signal broadcast receivers are monitored, or by 100, 200 and 400 kHz, in case of monitoring FM-signal broadcast receivers; in these cases it is necessary to provide three units 2. The interference signal from the adjacent channels in the receiver is by no means connected with the superheterodyne principle of the receiving, but is caused by the selectivity properties of the main amplifying channel of the receiver.

The number of the units 3 for shaping the signals of the additional channels may also be different according to the required degree of minotiring validity. The signals of the additional channels are the signals whose passage through the receiver is connected with the superheterodyne principle of the receiving and determined by the selectivity properties of the receiver channel up to the frequency converter, and by the performance of the frequency converter itself. The signals of the additional channel include the signal of the image (symmetrical) channel and the other signals with the frequencies equal to $nf_1 \pm mf_2$, where $f_1$ is the heterodyne frequency of the receiver, $f_2$ is the intermediate frequency of the receiver, and 'm' and 'n' are positive integers.

All the units 1, 2, 3 providing the shaping of the input test signal have a similar configuration, namely, each of them comprises a master oscillator 13 for generating a voltage at a frequency equal to, e.g., the intermediate frequency of the receiver, a mixer 14, and a filter 15 tuned to the signal frequency of a particular channel, the output of the master oscillator 13 being connected to the first input of the mixer 14 with its output connected to the input of the filter 15. The second inputs of the mixers 14 of all the units 1, 2, 3 are connected to the output 16 of the heterodyne of the receiver 17 being tested. Either a special terminal where the heterodyne voltage is applied, or the antenna output of the receiver 17, or an additional frame antenna picking up the waves of the heterodyne may be used as the output of the heterodyne of the receiver 17.

Where a spurious amplitude or frequency modulation of the receiver voltage may be expected, it is advisable to connect a device to extract the heterodyne carrier voltage between the output 16 of the heterodyne and the second inputs of the mixers 14.

Each of the units 2 for shaping the signals of the adjacent channels comprises, in addition to the above-mentioned elements, a second mixer 18 with one of its inputs connected to the output of the filter 15 of this unit, and a shift generator 19, the output of the latter being connected to the other input of the mixer 18. The shift generator 19 delivers a voltage at a frequency equal to the difference between the tune-in frequency of the receiver and the signal frequency of a given adjacent channel. The second mixer 18 may be formed by a balance circuit (multiplier) which suppresses the frequencies of both the input signals and extracts only two components at frequencies equal to the sum and the difference of the input signal frequencies, so there is no special need in the filter at the output of the mixer 18.

In order to provide stability of the frequencies of the master oscillators 13, the reference oscillator 7 and the phase-locked loops 8 are used. The output of the master oscillator 7 is connected with the first inputs of the phase-locked loops 8, the second inputs of the same being connected each with the output of the master oscillator 13 of the respective signal shaping unit, and its output connected with the synchronizing input of this master oscillator. All the phase-locked loops 8 have a similar configuration and consist of circuits such as phase detectors, comparison elements and filters. Such circuits are well known to those skilled in the art and so they are not shown in FIG. 1.

The voltage frequency of the reference oscillator 7 may be equal to the frequencies of the master oscillators 13, i.e. to the intermediate frequency of the receiver, or it may differ therefrom, in which latter case frequency dividers must be connected between the outputs of the master oscillators 13 and the respective inputs of the phase-locked loops 8, the division ratios being equal to the ratio of the frequency of the master oscillator 13 to the frequency of the reference oscillator 7. It will be noted, that in order to provide stable operation of the phase-locked loops 8 it is preferable that the frequency of the reference oscillator 7 lie below the frequency of the master oscillator 13, since it results in a larger frequency-locking bandwidth of the loops.

The modulation input of the master oscillator 13 of the unit 1 for shaping the tune-in frequency signal of the receiver is connected with the output of the desired signal shaper 4 representing a number of sine-wave oscillators 20 with their frequencies lying in the audio range and distributed within the passband of the receiver 17 to be tested. The number of audio-frequency oscillators 20 is determined by the number of frequency component required to evaluate the amplitude/frequency response of the receiver, connected to the outputs of the oscillators 20 is an adder 21.

The modulation inputs of the master oscillator 13 of the units 2 for shaping the signals of the adjacent channels are connected to the outputs of the respective interference signal oscillators 5.

According to one embodiment of the invention shown in FIG. 1, the outputs of the interference signal oscillators 6 are connected with the modulation inputs of the master oscillators 13 of the respective units 3 for shaping the signals of the additional channels.

Like the oscillators 20, the interference signal oscillators 5 and 6 are also audio-frequency oscillators, the signal of each of the oscillators 5 and 6 having at least one, the so-called marker, component differing in frequency from the component signals of the other oscillators 5 and 6. The presence of these components of the test signals unique for each of the interference signal oscillators 5 and 6 causes the signals of the different channels at the output of the receiver 17 to be effectively identifed and the performance of the receiver 17 to be properly estimated as to each of the respective parameters. Obviously, the frequencies of the component signals of the oscillators 5 and 6 must not coincide either with the frequencies of the components of the desired signal generated by the shaper 4 or with their harmonics.

The outputs of the filters 15 of the units 1 and 3 and the outputs of the mixers 18 of the units 2 are connected, through attenuators 22, to the respective inputs of the r.f. signal adder 9 whose output is connected with the input of the receiver 17 to be tested through a standard radiator or antenna simulator. The attenuators 22 specify the required levels of the components of the test signal applied to the input of the receiver 17.

According to another embodiment of the invention, each of the units 3 for shaping the signals of the additional channels comprises another mixer 23 (FIG. 2) whose one input is connected to the output of the filter 15 of this unit, the outputs of the interference signal oscillators 6 being connected to the other inputs of the mixers 23 of the respective units 3, and the outputs of the mixers 23 being connected through the attenuators 22 to the respective inputs of the R.F. signal adder 9. In this case the signals of the additional channels formed by the units 3 will not be frequency modulated, but they will be frequency shifted by the magnitudes of the respective marker frequencies.

Connected to the output of the receiver 17 (FIG. 1) to be tested coupled to a loudspeaker 24 is the input of the linear distortion analysis unit 10 and the input of the nonlinear distortion and interference analysis unit 11. The linear distortion analysis unit 10 may have another input connected with the output of the desired signal shaper 4 (This connection is indicated by a broken line in FIG. 1). The linear distortion analysis unit 10 includes a set of filters tuned to the frequencies of the oscillators 20 of the desired signal shaper 4, comparison elements and rectifiers. The number of outputs of the linear distortion analysis unit 10 may be equal to the number of desired signal frequency components being analyzed, i.e. to the number of oscillators 20, if data about variation of each of the desired components is needed, or to two, if high-and low-frequency distortion data is to be obtained, or else to one, if what we need is the data about distortion within the entire audio frequency range.

The nonlinear distortion and interference analysis unit 11 also consists of a set of filters, comparison elements and rectifiers, and the filters used may be either bandpass filters tuned to the marker frequencies of the signals of the adjacent and additional channels, to the specific freqencies for individual parameters such as the noise level and the background noise level, and to the harmonic frequencies of the desired signal components provided a separate indication of the receiver parameters related to the nonlinear distortion and interference level is required, or bandstop filters tuned to the frequencies of the oscillators 20, provided an integrated estimate of the receiver performance with respect to these parameters is required. The number of outputs of the unit 11 is determined by the aforementioned requirements as to how much detailed the analysis need to be.

The outputs of the linear distortion analysis unit 10 and the nonlinear distortion and interference analysis unit 11 are connected to the indicating unit 12 consisting of a set of pointer instruments or lamp indicators, each of them used for indicating one of the parameters checked. The number of inputs of the indicating units 12 is equal to the number of outputs of the analysis units 10 and 11, the outputs of the units 10 and 11 are connected to the respective inputs of the indicating unit 12.

In broadcast receivers there frequently occurs distortion which is hard to detect using the objective methods, but which is distinctly heard, thus producing an unpleasant dissonant sound effect. Among these kinds of distortion are the so-called "central cutoff", loudspeaker jarring, etc. In order to detect such distortion, according to the invention, the oscillators 20 of the desired signal shaper 4 provide voltages with the frequency ratios corresponding to the ratio of the consonant chord frequencies, their harmonics and subharmonics. For example, to reproduce the major sixth chord where the fundamental frequency ratio is 5:3, the desired signal shaper 4 may comprise eight oscillators 20 with the frequency ratio 1.5:2.5:3:5:6:10:12:20. When reproducing the consonant chord, on account of even the small signal distortion, new higher-order components appear which turn the consonant sounding into the dissonant one. In order that the test operator could record such an event, a desk 25, either key-actuated or sensor-type, is provided, each of the controlling members of the desk corresponding to a particular defect detected by hearing. The outputs of the desk 25 are connected with the inputs of the indicating unit 12 provided therefore. Using the desk 25, data also may be entered into the indicating unit 12 concerning the defects of the vernier device of the receiver or the flaws in its exterior finishing.

The indicating unit 12 may have computer outputs for statistical processing of the monitoring data, or it may be connected with an actuator which directs the checked receiver for packing and delivery to the consumer or else for correction to an appropriate adjuster, depending on the monitoring test results.

The description of the operation of the proposed arrangement now follows.

When the receiver 17 to be tested is turned on, a voltage appears at the output 16, at the heterodyne frequency, which voltage is applied to the mixers 14. The master oscillators 13 of the signal-shaping units 1, 2, 3 generate the voltages at a frequency close to the intermediate frequency of the receiver 17 to be tested. These voltages are applied to the phase-locked loops 8, where a voltage is also applied from the reference oscillator 7 either directly, provided the frequencies of the reference oscillator 7 and of the master oscillators 13 are equal, or through the dividers (not shown) otherwise.

The voltages from the outputs of the phase-locked loops 8 adjust the master oscillators 13 making their frequencies equal.

A desired signal from the shaper 4 is applied to the modulation input of the master oscillator 13 of the unit 1, and signals from the interference signal oscillators 5 and 6 are applied to the modulation inputs of the master oscillators 13 of the units 2 and 3, respectively, thus frequency or amplitude modulating the voltages of the master oscillators 13. In this case the voltages of all the master oscillators will have the same carrier frequency but different modulation frequencies, which allows a separate indication of the signals of each of the units 1, 2, 3 at the output of the receiver 17.

The automatic phase-locking of the frequency of the master oscillators 13 does not affect the modulation process, since the cutoff frequencies of the filters (not shown) in the phase-locked loops are selected below the lower modulating frequency.

Figure 2:
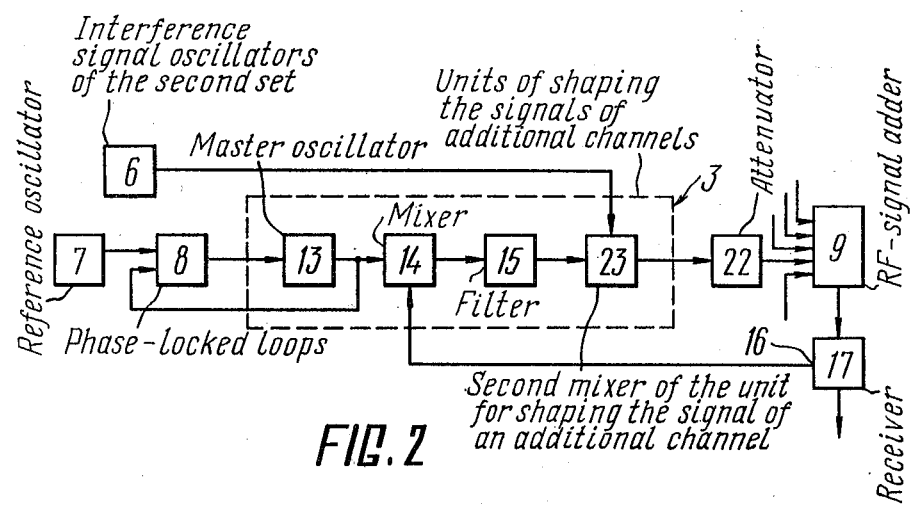
FIG. 2 is one of the embodiments of the units for shaping the signals of the additional channels within the apparatus as shown in FIG. 1.

If the units 3 for shaping the signals of the additional channels have a circuit configuration shown in FIG. 2, the voltages of the master oscillators 13 of these units are not frequency modulated, and at the output of the mixer 23 of each unit 3, the signal of the additional channel will be frequency shifted by the magnitude of the marker frequency of the respective interference signal oscillator 6 which, as indicated above, differs from the marker frequencies of the other oscillators 6 and the oscillators 5 (FIG. 1). As such a frequency-shifted signal is applied, there occur in the receiver frequency beats between this signal and the receiver tune-in frequency signal, the beat frequency equalling the specific marker frequency.

As a result of converting the frequency of the voltages of the master oscillators 13 by the mixers 14, a test signal appears at the output of the adder 9 corresponding to the setting of the tuning controls of the receiver 17.

If the characteristics of the i.f. channel of the receivers to be tested have a spread, a precise adjustment of the frequency of the reference oscillator 7 can be made for this particular receiver, the frequency adjustment of the reference oscillator 7 not disturbing the stability of frequencies of the master oscillators 13 with respect to one another. In further measurements of the parameters of this receiver at other tune-in frequencies, the frequency adjustment of the reference oscillator 7 is not required.

By means of the attenuators 22, the level of the tune-in frequency signal shaped by the unit 1 is set equal to the sensitivity value of the receiver 17 limited by the noise, while the levels of the signals shaped by the units 2 and 3 are set according to the objectives accepted for the receivers of the given type regarding the attentuation of the signals of the adjacent and additional channels.

The signal from the output of the receiver 17 to be tested is applied to the linear distortion analysis unit 10 with the voltages developed at the outputs thereof which are proportional to the variation of the components of the desired signal generated by the shaper 4, and to the nonlinear distortion and interference analysis unit 11 which derives the marker frequency signals of the oscillators 5 and 6 (interference signals) as well as the components which are absent from the desired signal and are generated in the receiver 17 itself, such as the components at harmonic frequencies of the desired signal, intermodulation components, noise signals whose frequency band is free from the desired signal components, interference signals, their harmonics and combination components, and background noise signals at frequencies which are multiples of the mains frequency, e.g. 50, 100, and 150 Hz.

The signals corresponding to the analysis results are simultaneously applied from the outputs of the units 10 and 11 to the indicating unit 12, which provides for a separate indication of the parameters being monitored of the receiver 17.

If the desired signal generated by the shaper 4 is a consonant chord, the test operator listening to this signal reproduced by the receiver 17 determines whether the receiver 17 introduces the dissonance distortion and whether the loudspeaker 24 or other elements of the receiver 17 exhibit jarring. The test operator enters the data into the indicating unit 12 via the desk 25 using appropriate controls.

Thus the proposed apparatus provides a simultaneous measurement of the following parameters of the receivers:
amplitude/frequency characteristic distortion,
selectivity against adjacent channels,
selectivity against additional channels,
crosstalk,
harmonic factor,
intermodulation coefficient,
noise level,
background noise level.

The measurements at other tune-in frequencies of the receiver are carried out in a similar manner, the indication of its parameters being performed essentially simultaneously with its frequency retuning.

So the implementation of the proposed invention results in a significant reduction in monitoring time of the receivers, and in a higher information efficiency of the monitoring process thus allowing a longer guaranteed useful life of the receivers manufactured and resulting in a lower cost of repairing the operating receivers.

The above specific embodiments of the invention are only given by way of example and do not restrict the scope of the invention as disclosed in the following claims:

What is claimed is:

1. An apparatus for automatic monitoring of superheterodyne radio receivers having an input, an output, and a heterodyne output, comprising:
   a unit for shaping the tune-in frequency signal of the receiver, including,
   a master oscillator having a synchronizing input, a modulation input and an output;
   a mixer having a first input connected to said output of said master oscillator, a second input connected to said heterodyne output of the receiver to be tested, and an output; and
   a filter having an input connected to said output of said mixer, and an output;
   a plurality of units for shaping the signals of adjacent channels each of which includes:
   a master oscillator having a synchronizing input, a modulation input, and an output;
   a first mixer having a first input connected to said output of said master oscillator of this unit, a second input connected to said heterodyne output of the receiver to be tested, and an output;
   a filter having an input connected to said output of said first mixer, and an output;
   a shift generator adapted for generating a voltage at a frequency equal to the difference between the tune-in frequency of the receiver and the signal frequency of a particulator adjacent channel, and having an output; and
   a second mixer having a first input connected to said output of said filter of this unit, a second input connected to said output of said shift generator, and an output;
   a plurality of units for shaping the signals of additional channels including each:
   a master oscillator having a synchronizing input, a modulation input, and an output;
   a mixer having a first input connected to said output of said master oscillator of this unit, a second input connected to said heterodyne output of the receiver to be tested, and an output; and
   a filter having an input connected to said output of said mixer of this unit, and an output;
   a desired signal shaper having an output connected to said modulation input of said master oscillator of said unit for shaping the tine-in frequency signal of the receiver;
   a first set of interference signal oscillators, their number being equal to the number of said units for shaping the sigals of adjacent channels, each of said interference signal oscillators of the first set having an output connected to said modulation input of said master oscillator of one of said units for shaping the signals of adjacent channels;
   a second set of interference signal oscillators, their number being equal to the number of said units for shaping the signals of additional channels, each of said interference signal oscillators of the second set having an output; connected to a respective one of said units for shaping the signals of additional channels
   a reference oscillator having an output;
   a plurality of phase-locked loops, their number being equal to the number of all said signal-shaping units, each of said phase-locked loops having a first input connected to said output of said reference oscillator, a second input connected to said output of said master oscillator of one of said signal-shaping units, and an output connected to said synchronizing input of said master oscillator of this signal-shaping unit;
   an adder of r.f. signals having a plurality of inputs with their number equal to the number of all signal-shaping units, said inputs of said adder being connected to said output of said filter of said unit for shaping the tune-in frequency signal of the receiver, to said outputs of said filters of said units for shaping the signals of additional channels, and to said outputs of said second mixers of said units for shaping the signals of adjacent channels respectively; and having an output connected to said input of said receiver
   a linear distortion analysis unit having an input connected to said output of the receiver to be tested, and at least one output;
   a nonlinear distortion and interference analysis unit having an input connected to said output of the receiver to be tested, and at least one output; and
   an indicating unit connected to said outputs of said linear distortion analysis unit and said nonlinear distortion and interference analysis unit.

2. An apparatus as disclosed in claim 1, wherein said outputs of said interference signal oscillators of the second set are connected to said modulation input of said master oscillator of the respective one of said units for shaping the signals of additional channels, respectively.

3. An apparatus as disclosed in claim 1, wherein each said units for shaping the signals of additional channels further comprise one more mixer having a first input connected to said output of said filter of this unit, a second input connected to said output of one of said interference signal oscillators of the second set, and an output connected to the respective input of said r.f. signal adder.

4. An apparatus as disclosed in claim 1, wherein said desired signal shaper includes a pluralty of audio frequency oscillators providing voltages with the frequency ratios corresponding to the ratio of the consonance chord frequencies, their harmonics and subharmonics, and which further comprises a desk connected to said indicating unit for entering thereinto of data concernig the sounding quality of the receiver being tested.

5. An apparatus as disclosed in claim 2, wherein said desired signal shaper includes a plurality of audio frequency oscillators providing voltages with the frequency ratios corresponding to the ratio of the consonance chord frequencies, their harmonics and subharmonics, and which further comprises a desk connected to said indicating unit for entering thereinto of data concerning the sounding quality of the receiver being tested.

* * * * *